No. 716,726. Patented Dec. 23, 1902.
J. P. LEIB.
FISHING LINE ATTACHMENT.
(Application filed May 6, 1902.)
(No Model.)
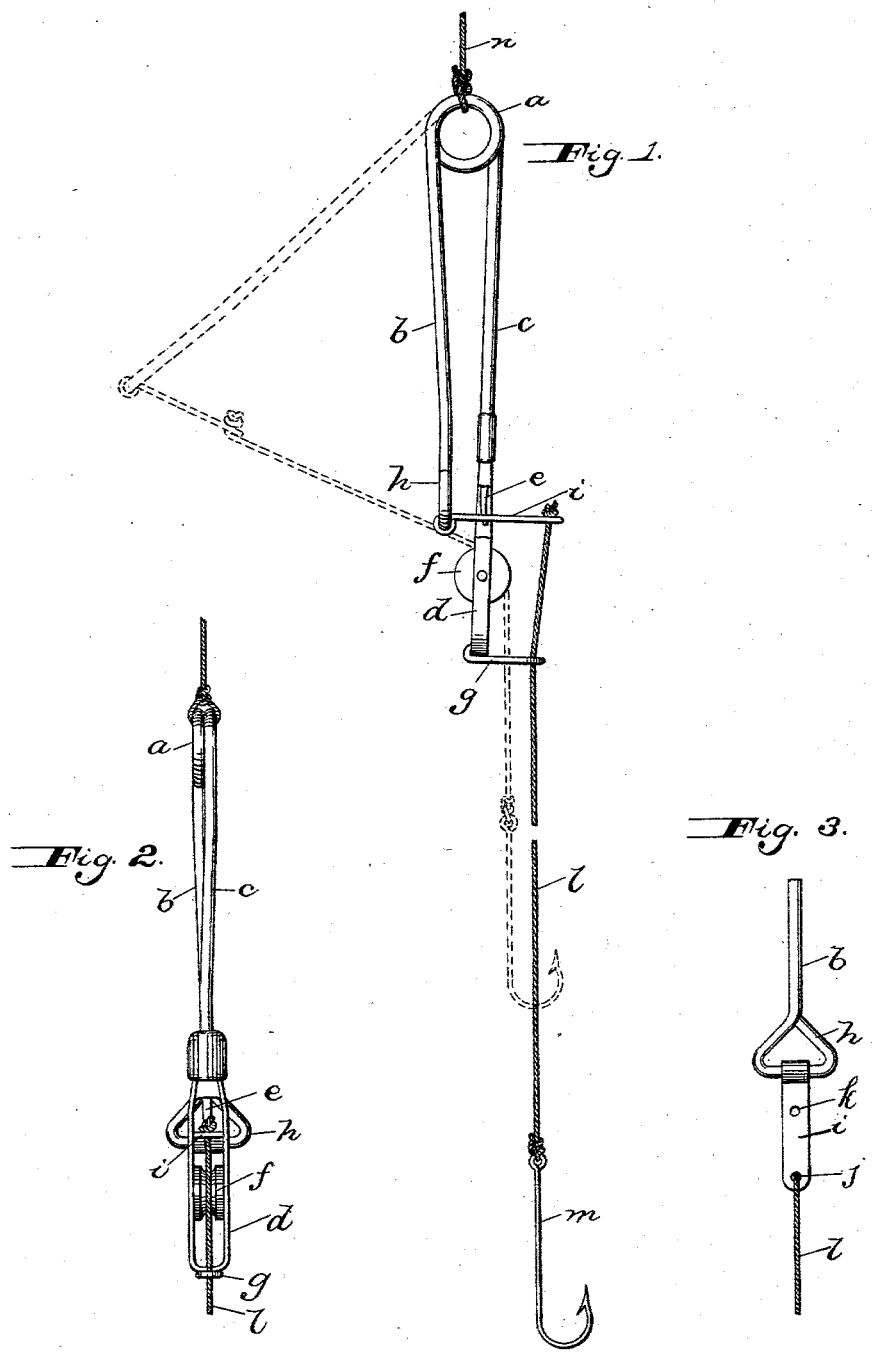

UNITED STATES PATENT OFFICE.

JESSE P. LEIB, OF BALTIMORE, MARYLAND.

FISHING-LINE ATTACHMENT.

SPECIFICATION forming part of Letters Patent No. 716,726, dated December 23, 1902.

Application filed May 6, 1902. Serial No. 106,132. (No model.)

*To all whom it may concern:*

Be it known that I, JESSE P. LEIB, a citizen of the United States, residing at Baltimore, State of Maryland, have invented certain new and useful Improvements in Fishing-Line Attachments, of which the following is a specification.

The object of this invention is to provide an attachment for fishing-lines whereby a pull on the hook will cause a quick upward jerk of the hook to effect a capture of the fish.

The invention consists in certain constructions of parts hereinafter fully described and claimed, reference being had to the accompanying drawings, in which—

Figure 1 is a side view of the improved fishing-line attachment, illustrating in full lines the set position and in dotted lines the position assumed when the attachment has been sprung by a fish. Fig. 2 is a view looking at the attachment from the right of Fig. 1. Fig. 3 is a view of the lower end of one of the spring-arms of the attachment.

My improved fishing-line attachment comprises a single rod of spring metal coiled at its middle, as shown at $a$, and provided with two arms $b$ $c$, having a tendency to spring away from each other at their ends. To the end of one of said arms is rigidly secured an open frame $d$, extending in alinement with the said arm. A downwardly-extending tapering pin $e$ is rigidly secured in the upper end of said frame. A grooved pulley $f$ is journaled in said frame below said pin, and a laterally-projecting loop $g$ is secured to the lower end of said frame, as illustrated in Figs. 1 and 2. The end of the other arm is turned upon itself to form a triangle-shaped hanger $h$, to which a latch-plate $i$ is pivotally secured by having one end curled around the hanger, and said latch-plate is provided with two apertures $j$ $k$, one at its outer end and the other intermediate of its ends, as shown best in Fig. 3. That portion $l$ of the fishing-line which carries the hook $m$ is secured in the end aperture $j$ and passes down through the loop $g$.

The attachment is suspended by its coil $a$ from the fishing-line $n$, and in practice the lower ends of the two arms are brought together, as illustrated in Fig. 1, and the latch-plate $i$ is swung upwardly, so that the pin $e$ will take in the aperture $k$ to lock said arms together under tension with the hook in lowest position. When a fish pulls on the baited hook, the pull will release the latch-plate from the pin and the tension will cause the arms to spring apart, thereby imparting a quick upward movement to the hook and facilitating the capture of the fish. As the arm $b$, carrying the line $l$ and hook $m$, swings outwardly away from the other arm the said line will travel over the grooved pulley $f$ and will also travel over said pulley when the operator pulls on it to set the attachment. Hence the said line will not become worn as quickly as it would if it rubbed over a stationary part. As the pin $e$ is tapered, the latch-plate $i$ may be thrust on the said pin with different degrees of frictional engagement, as desired, according to the weight of the baited hook used or the approximate size of the fish it is desired to catch.

Having thus described my invention, what I claim as new, and desire to secure by Letters Patent, is—

1. A fishing-line attachment, comprising two arms having a tendency to spring apart at their ends; a frame secured to the end of one of the arms and provided with a tapered pin, a pulley, and a laterally-extending loop; and a latch-plate pivotally attached to the end of the other arm and provided with an aperture to receive said tapered pin, whereby said latch-plate may be secured with varying degrees of frictional engagement on said pin, as and for the purpose set forth.

2. A fishing-line attachment, comprising a rod coiled between its ends and forming two arms having a tendency to spring apart and one of said arms being bent at its end to form a hanger, $h$; a frame secured to the end of the other arm and provided at its upper end with a downwardly-extending tapered pin; a pulley journaled in said frame below said pin; a laterally-extending loop secured to the lower end of said frame; and a latch-plate having one end curled around said hanger, $h$, whereby it is pivotally connected thereto, and said latch-plate also provided with an aperture to receive said tapered pin, as and for the purpose set forth.

In testimony whereof I affix my signature in the presence of two witnesses.

JESSE P. LEIB.

Witnesses:
CHARLES L. VIETSCH,
FREDERICK S. STITT.